US008072464B2

(12) United States Patent
Woo et al.

(10) Patent No.: US 8,072,464 B2
(45) Date of Patent: Dec. 6, 2011

(54) 3-DIMENSIONAL GRAPHICS PROCESSING METHOD, MEDIUM AND APPARATUS PERFORMING PERSPECTIVE CORRECTION

(75) Inventors: Sang-Oak Woo, Anyang-si (KR); Do-Kyoon Kim, Seongnam-si (KR); Kee-Chang Lee, Yongin-si (KR); Jeong-Hwan Ahn, Suwon-si (KR); Se-Yoon Tak, Yongin-si (KR); Sergey U. Belyaev, Saint Petersburg (RU)

(73) Assignee: Samsung Electronics Co., Ltd., Suwon-Si (KR)

( * ) Notice: Subject to any disclaimer, the term of this patent is extended or adjusted under 35 U.S.C. 154(b) by 1164 days.

(21) Appl. No.: 11/802,912

(22) Filed: May 25, 2007

(65) Prior Publication Data

US 2007/0273692 A1    Nov. 29, 2007

(30) Foreign Application Priority Data

May 26, 2006  (KR) .................. 10-2006-0047541
May 16, 2007  (KR) .................. 10-2007-0047834

(51) Int. Cl.
*G09G 5/02* (2006.01)
(52) U.S. Cl. ........ 345/606; 345/419; 345/426; 345/427; 345/428; 345/581; 345/610; 345/619; 382/260; 382/293; 382/295; 382/300
(58) Field of Classification Search .................. None
See application file for complete search history.

(56) References Cited

U.S. PATENT DOCUMENTS 5,222,204 A *  6/1993  Swanson ................. 345/427

5,719,600 A    2/1998  Alcorn
6,236,404 B1   5/2001  Iimura et al.
7,768,512 B1 * 8/2010  Iourcha et al. ............. 345/441

FOREIGN PATENT DOCUMENTS

| EP | 0 718 797 | 6/1996 |
| KR | 10-2000-0040483 | 7/2000 |
| WO | 98/29837 | 7/1998 |

OTHER PUBLICATIONS

Korea Office Action for corresponding Korean Patent Application No. 10-2007-0047834 dated Nov. 14, 2008, pp. 1-4.
European Office Action with Search Report mailed on Oct. 12, 2007 for European Application 07 10 8916.
Zhang et al., "Perspective-Correct Normal for Equal Angle Interpolation", Dept. of Computer and Communication Engineering, 2005, IEEE, pp. 1020-1024 (in English).
Korean Office Action for corresponding Korean Patent Application No. 10-2007-0047834 dated Feb. 11, 2009 (4 pgs).

* cited by examiner

*Primary Examiner* — Antonio Caschera
(74) *Attorney, Agent, or Firm* — Staas & Halsey LLP

(57) ABSTRACT

A 3D graphics processing method includes receiving a homogeneous coordinate and an attribute value of both end points of one scan line of a polygon composed of a plurality of perspective projected vertices, calculating a reference value indicating an amount of perspective distortion in the scan line using the received homogeneous coordinates, and interpolating an attribute value of each of pixels of the scan line using at least some of the received homogeneous coordinates and attribute values, the attribute value interpolated by selectively applying perspective correction to each pixel based on the reference value.

26 Claims, 12 Drawing Sheets

WHEN PERSPECTIVE DISTORTION OCCURS

WHEN PERSPECTIVE DISTORTION DOES NOT OCCUR $w_2 = w_1 + n \cdot w_s$

3-DIMENSIONAL GRAPHICS PROCESSING METHOD, MEDIUM AND APPARATUS PERFORMING PERSPECTIVE CORRECTION

CROSS-REFERENCE TO RELATED APPLICATIONS

This application claims the benefit of Korean Patent Application No. 10-2006-0047541, filed on May 26, 2006, and No. 10-2007-0047834, filed on May 16, 2007 in the Korean Intellectual Property Office, the disclosure of which is incorporated herein in its entirety by reference.

BACKGROUND

1. Field

One or more embodiments of the present invention relate to a 3-dimensional (3D) graphics processing method, medium and apparatus, and more particularly, to a 3D graphics processing method, medium and apparatus correcting perspective distortion occurring due to perspective projection.

2. Description of the Related Art

A 3-dimensional (3D) graphics processing process can be largely divided into a geometry stage and a rasterization stage.

The geometry stage can be largely divided into a model and view transformation stage, a camera transformation stage, a lighting and shading stage, a projection stage, a clipping stage, and a screen mapping stage. The model and view transformation stage is a technique of transforming a 3D object to a world coordinate system in a 3D space and transforming the 3D object of the world coordinate system to a camera coordinate system based on a point of view (camera). The lighting and shading stage is a process of representing a reflection effect and a shading effect due to a light source in order to enhance realism of the 3D object. The projection stage is a technique of projecting the 3D object of the camera coordinate system onto a 2D screen, and the clipping stage is a technique of clipping a portion of a primitive, which is out of a view volume, in order to transfer only a portion of the primitive, which is within the view volume, to the rasterization stage. The screen mapping stage is a technique of determining coordinates of the projected object when the projected object is output to the 2D screen.

The rasterization stage is a technique for determining correct attribute values for each pixel using coordinates of each vertex, colors, and texture of the 3D object provided from the geometry stage, wherein a triangle is set using information on vertices of the 3D object, and the correct attribute values for each pixel are obtained by performing edge processing and scan line processing in the set triangle.

In particular, the projection stage is a requisite technique in the 3D graphics processing technique and uses an orthographic projection or perspective projection technique. The orthographic projection technique performs projection by arranging one of an x, y, and z axis in a 3D coordinate system to be parallel to a projecting direction and a projection plane to be perpendicular to the axis parallel to the projecting direction. Since an object is projected onto the projection plane while maintaining relative sizes and angles viewed from a perpendicular direction in the orthographic projection technique, the orthographic projection technique is usually used in machine or architecture design. However, since perspective is not expressed in the orthographic projection technique, a realistic screen is not created. Unlike the orthographic projection technique, since projection lines are not parallel to each other in the perspective projection technique, each axis is projected onto a projection plane in a non-perpendicular direction. In the perspective projection technique, since a figure obtained by viewing a 3D object from one point of view (camera) appears on a 2D projection plane, projection lines are pointed to the point of view. If the perspective projection technique is used, since an object located far away from the point of view is projected as a relatively small figure and an object located close to the point of view is projected as a relatively large figure, a realistic projection result can be obtained as if a person directly saw a 3D figure with their own eyes. Thus, if a realistic screen is necessary as in virtual reality, games, and animation, the perspective projection technique is used.

Meanwhile, in the 3D graphics processing technique, the perspective projection technique is performed in a homogeneous coordinate system. The homogeneous coordinate system further uses one dimension added to 3 dimensions, i.e. dot, vector, and matrix. That is, in the homogeneous coordinate system, a point is expressed using four elements x, y, z, and w, instead of three elements x, y, and z. The fourth element w is called a homogeneous coordinate. In the homogeneous coordinate system, perspective projection transformation is performed using a 4×4 matrix, and when coordinates (x', y', z', w) are obtained as a result of the perspective projection transformation, (x, y, z, 1), i.e. (x=x'/w, y=y'/w, z=z'/w, 1), which is a result obtained by dividing the coordinates (x', y', z', w) by the homogeneous coordinate w, become screen coordinates.

If the perspective projection transformation is performed for vertices of a 3D object, in the rasterization stage, attribute values of points other than the vertices are obtained by performing interpolation using attribute values of the vertices. In this case, if a general linear interpolation technique is used, perspective distortion occurs in a color value or texture coordinates. FIG. 1A is a diagram for describing the occurrence principle of perspective distortion in a color value. When two vertices expressed in black and white in FIG. 1A are perspective projected, an intermediate point in the middle of the two vertices is located close to one of the two vertices, e.g. the black point. Although it is normal that the intermediate point close to the black point has a true gray color, a gray color close to black is shown as a result of the interpolation. FIG. 1B shows a case where perspective distortion occurs in texture coordinates. If perspective distortion does not occur, a normal screen shown on the left of FIG. 1B must be displayed as a result of texture mapping. However, if linear interpolation is performed for texture coordinates (u, v), a distorted screen shown on the right of FIG. 1B is displayed.

Correction of this perspective distortion is called perspective correction. A representative perspective correction technique is a hyperbolic interpolation technique. The hyperbolic interpolation technique is based on the fact that attribute values of a pixel, e.g., values obtained by dividing texture coordinates by a homogeneous coordinate w and an inverse value 1/w of the homogeneous coordinate, have a linear characteristic. The hyperbolic interpolation technique will now be schematically described. FIG. 2 is a diagram for describing the hyperbolic interpolation technique. It is assumed that texture coordinates and homogeneous coordinates of both end points 22 and 23 of one scan line 21 of a triangle formed by three vertices are respectively (u1, v1), w1 and (u2, v2), w2 and texture coordinates and a homogeneous coordinate of an arbitrary point of the scan line 21 are (u, v) and w. First, values obtained by dividing texture coordinates by each corresponding homogeneous coordinate and inverse values of the homogeneous coordinates, i.e. (u1/w1, v1/w1), 1/w1, (u2/w2, v2/w2), and 1/w2, are obtained for the both end points 22 and

23. Next, (u/w, v/w) is linear-interpolated using (u1/w1, v1/w1) and (u2/w2, v2/w2), and 1/w is linear-interpolated using 1/w1 and 1/w2. Finally, values obtained by dividing the interpolated (u/w, v/w) by the interpolated 1/w, i.e. {(u/w)/(1/w), (v/w)/(1/w)}, are obtained as texture coordinates of the arbitrary point 24.

In a conventional 3D graphics processing technique, when the perspective correction is performed, the hyperbolic interpolation technique is applied to all pixels on each scan line. The hyperbolic interpolation technique needs division operations, and high computational power is required for these division operations. In particular, since an Advanced Reduced Instruction Set Computer (RISC) Machine Central Processing Unit (ARM CPU) usually used in mobile devices processes various operations using software, a long processing time and high power consumption are required for the division operations. Since an amount of perspective distortion can vary, if the hyperbolic interpolation technique is applied to all pixels without considering the amount of perspective distortion, processing time and power consumption are unnecessarily wasted.

SUMMARY

One or more embodiments of the present invention provide a 3-dimensional (3D) graphics processing method performing perspective correction to realize a short processing time and low power consumption by selectively applying perspective correction based on the amount of perspective distortion.

One or more embodiments of the present invention also provide a 3D graphics processing apparatus for performing perspective correction to realize a short processing time and low power consumption by selectively applying perspective correction based on the amount of perspective distortion.

One or more embodiments of the present invention also provide a computer readable recording medium storing a computer readable program executing the 3D graphics processing method.

Additional aspects and/or advantages will be set forth in part in the description which follows and, in part, will be apparent from the description, or may be learned by practice of the invention.

To achieve at least the above and/or other aspects and advantages, embodiments of the present invention include a 3-dimensional (3D) graphics processing method comprising: (a) receiving a homogeneous coordinate and an attribute value of each of both end points of one scan line of a polygon composed of a plurality of perspective projected vertices; (b) calculating a reference value indicating an amount of perspective distortion in the scan line using the received homogeneous coordinates; and (c) interpolating an attribute value of each of pixels of the scan line using at least some of the received homogeneous coordinates and attribute values, the attribute value interpolated by selectively applying perspective correction to each pixel based on the reference value.

The plurality of vertices may be three vertices, and the polygon may be a triangle.

Operation (b) may comprise calculating the reference value based on at least one of the homogeneous coordinates of the both end points and a homogeneous coordinate change between adjacent pixels of the scan line.

The reference value may be a ratio of the at least one of the homogeneous coordinates of the both end points to the homogeneous coordinate change between adjacent pixels of the scan line.

Each of the at least one of the homogeneous coordinates of the both end points and the homogeneous coordinate change between adjacent pixels of the scan line may be expressed by a predetermined antilogarithmic number, and the reference value may be calculated using the number of digits of each of the predetermined antilogarithmic numbers.

The number of digits of each of the predetermined antilogarithmic numbers may be obtained by shifting each of the predetermined antilogarithmic numbers.

The reference value may be calculated using a logarithmic value of the at least one of the homogeneous coordinates of the both end points and a logarithmic value of the homogeneous coordinate change between adjacent pixels of the scan line.

Operation (c) may comprise interpolating the attribute values using perspective correction according to a hyperbolic interpolation method.

Operation (c) may comprise: (c1) determining pixels that are to be interpolated by applying perspective correction, based on the reference value; (c2) interpolating an attribute value of each of the determined pixels by applying perspective correction according to a result of the determination; and (c3) linear interpolating an attribute value of each of pixels remaining by excluding the determined pixels.

Operation (c2) may comprise: (cc1) linear interpolating a value obtained by dividing an attribute value by a homogeneous coordinate with respect to one of the determined pixels using a value obtained by dividing an attribute value by a homogeneous coordinate with respect to each of the both end points; (cc2) linear interpolating an inverse number of the homogeneous coordinate with respect to the pixel using inverse numbers of the homogeneous coordinates with respect to the both end points; and (cc3) calculating an attribute value interpolated by applying perspective correction, by dividing the linear interpolated value, which is obtained by dividing an attribute value by a homogeneous coordinate, by linear interpolated inverse number of the homogeneous coordinate.

Operation (c3) may comprise linear interpolating the attribute value of each of pixels remaining by excluding the determined pixels, using at least some of the attribute values of the both end points and the attribute value interpolated by applying perspective correction.

The attribute value may comprise at least one of texture coordinates, a diffuse color, and a specular color.

To achieve at least the above and/or other aspects and advantages, embodiments of the present invention include a 3-dimensional (3D) graphics processing apparatus comprising: a reference value calculator receiving a homogeneous coordinate and an attribute value of each of both end points of one scan line of a polygon composed of a plurality of perspective projected vertices and calculating a reference value indicating an amount of perspective distortion in the scan line using the received homogeneous coordinates; and an interpolator interpolating an attribute value of each of pixels of the scan line using at least some of the received homogeneous coordinates and the received attribute values of the both end points, the attribute value interpolated by selectively applying perspective correction to each pixel based on the reference value.

The interpolator may comprise: a determiner determining pixels that are to be interpolated by applying perspective correction, based on the reference value; a first interpolator interpolating an attribute value of each of the determined pixels by applying perspective correction according to a result of the determination; and a second interpolator linear interpolating an attribute value of each of pixels remaining by excluding the determined pixels.

The first interpolator may comprise: a linear interpolator linear interpolating a value obtained by dividing an attribute value by a homogeneous coordinate with respect to one of the determined pixels using a value obtained by dividing an attribute value by a homogeneous coordinate with respect to each of the both end points, and linear interpolating an inverse number of the homogeneous coordinate with respect to the pixel using inverse numbers of the homogeneous coordinates with respect to the both end points; and an attribute value calculator calculating an attribute value interpolated by applying the perspective correction, by dividing the linear interpolated value, which is obtained by dividing an attribute value by a homogeneous coordinate, by linear interpolated inverse number of the homogeneous coordinate.

The second interpolator can linear interpolate the attribute value of each of pixels remaining by excluding the determined pixels, using at least some of the attribute values of the both end points and the attribute value interpolated by applying the perspective correction.

To achieve at least the above and/or other aspects and advantages, embodiments of the present invention include a computer readable recording medium storing a computer readable program for executing the 3D graphics processing method.

BRIEF DESCRIPTION OF THE DRAWINGS

These and/or other aspects and advantages will become apparent and more readily appreciated from the following description of the embodiments, taken in conjunction with the accompanying drawings of which.

DETAILED DESCRIPTION OF EMBODIMENTS

Figure 1A:
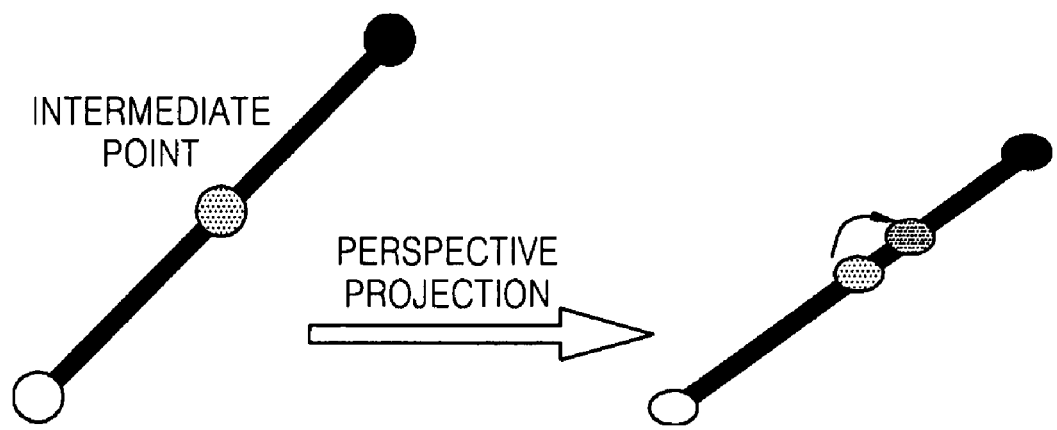
FIG. 1A illustrates the occurrence principle of perspective distortion in a color value.
Figure 1B:
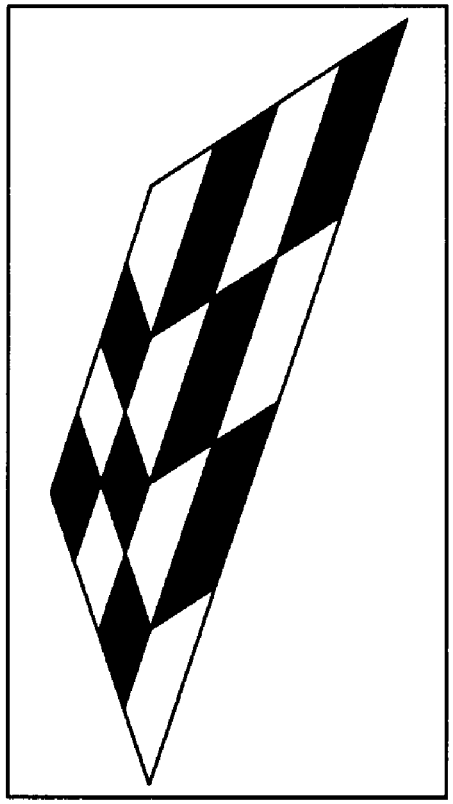
FIG. 1B illustrates a case where perspective distortion occurs in texture coordinates.
Figure 1B:
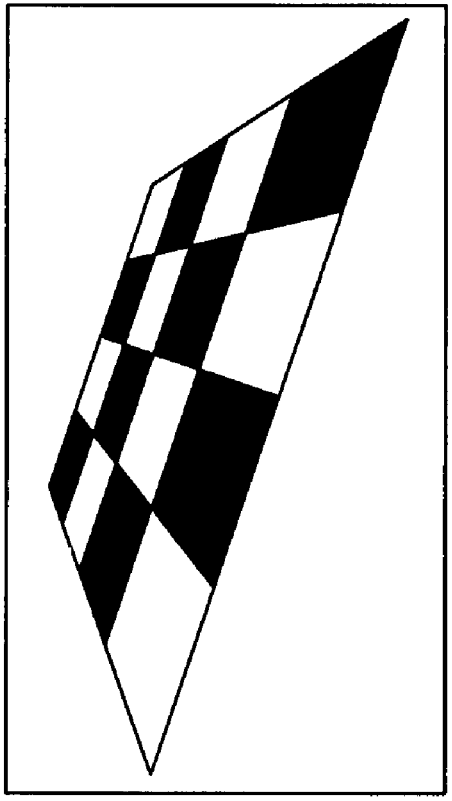
Figure 2:
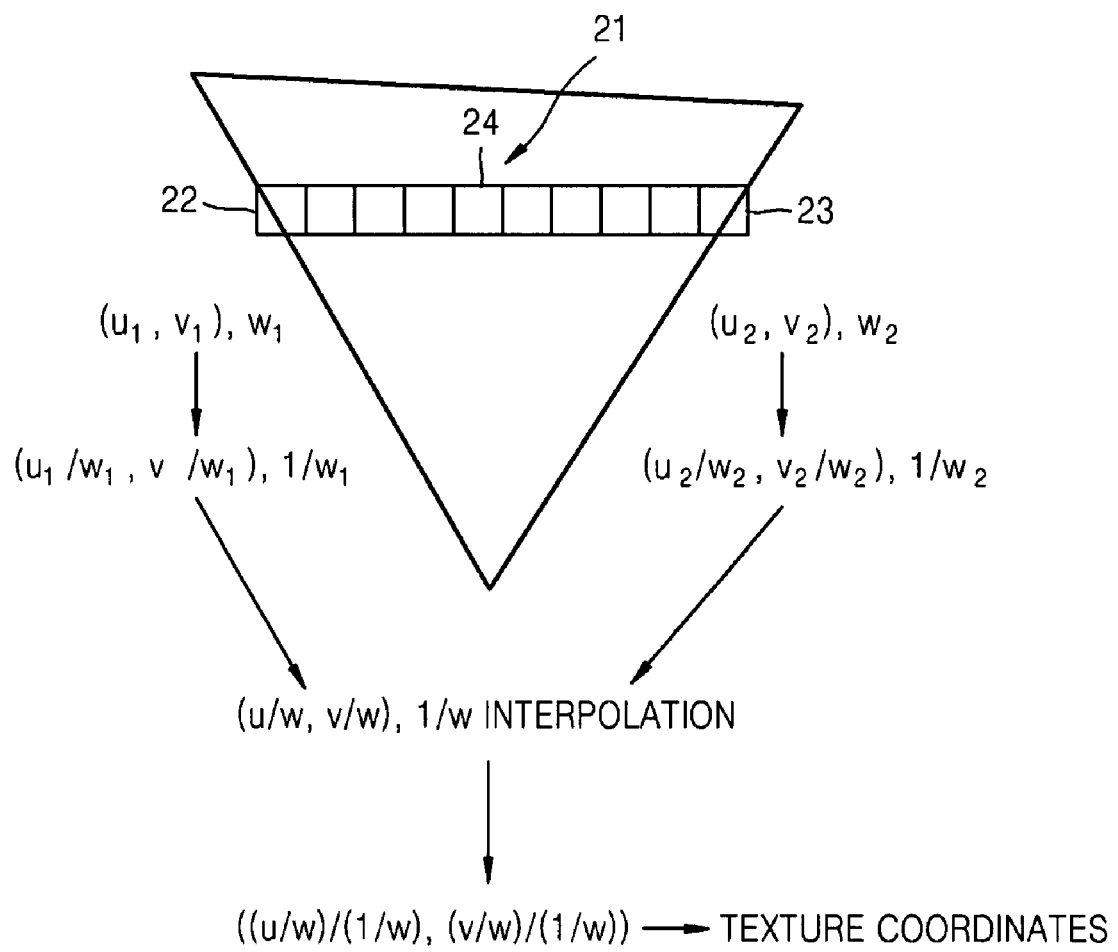
FIG. 2 illustrates a hyperbolic interpolation method.

Reference will now be made in detail to embodiments, examples of which are illustrated in the accompanying drawings, wherein like reference numerals refer to the like elements throughout. Embodiments are described below to explain the present invention by referring to the figures.

Figure 3:
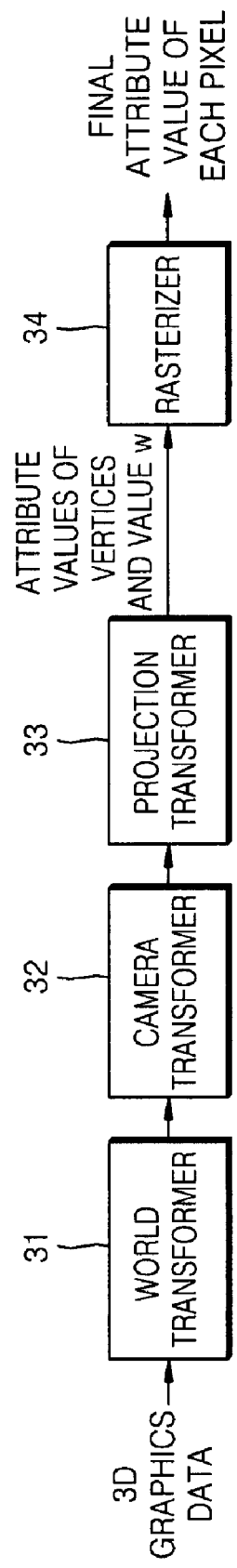
FIG. 3 illustrates a 3-dimensional (3D) graphics processing apparatus, according to an embodiment of the present invention.

FIG. 3 illustrates a 3-dimensional (3D) graphics processing apparatus, according to an embodiment of the present invention. Referring to FIG. 3, the 3D graphics processing apparatus may include, for example, a world transformer 31, a camera transformer 32, a projection transformer 33, and a rasterizer 34.

The world transformer 31 may transform a 3D object defined in a local coordinate system to a world coordinate system in a 3D space. The world transformer 31 may perform transformation, such as translation, rotation, and scaling.

The camera transformer 32 may transform the 3D object of the world coordinate system to a camera coordinate system based on a point of view (camera).

The projection transformer 33 may project the 3D object of the camera coordinate system onto a 2D screen. The projection transformer 33 may perform projection transformation of each of the vertices forming the 3D object using a perspective projection matrix. As a result of the projection transformation, attribute values of each vertex, e.g., screen coordinates, texture coordinates, a diffuse color, a specular color, and a homogeneous coordinate w of each vertex may be obtained. The 3D graphics processing apparatus may further include a storage unit in order to store the obtained homogeneous coordinates.

The rasterizer 34 may determine a final attribute value of each pixel using the attribute value and the homogeneous coordinate of each vertex provided by the projection transformer 33. The rasterizer 34 will now be described in more detail with reference to FIG. 4.

Figure 4:
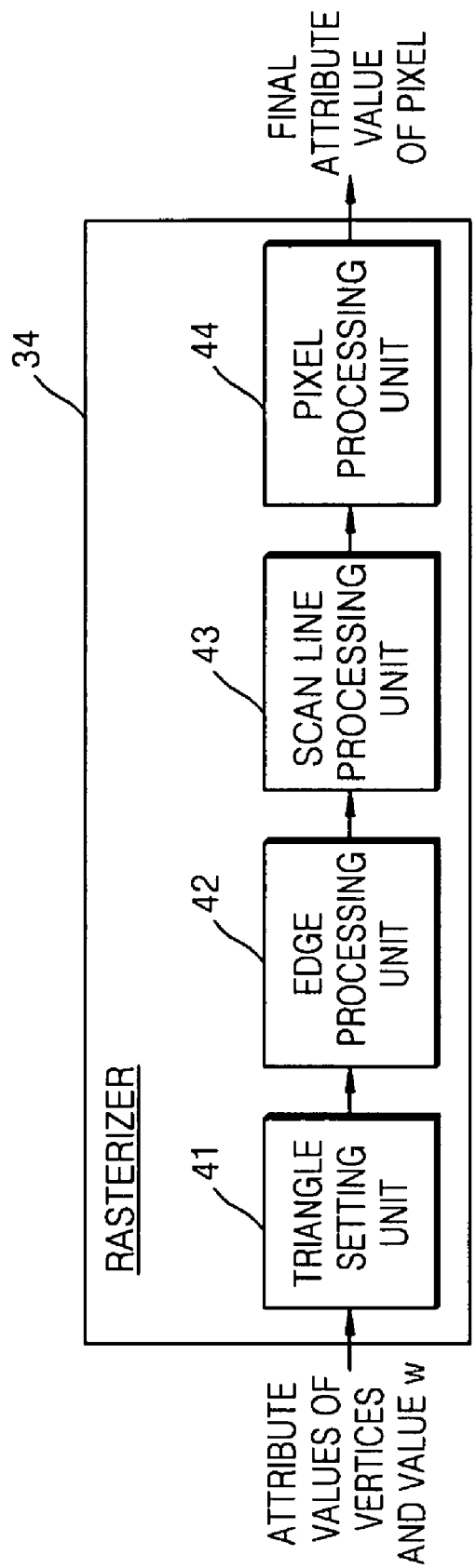
FIG. 4 illustrates a rasterizer, according to an embodiment of the present invention.

FIG. 4 illustrates rasterizer 34, according to an embodiment of the present invention. Referring to FIG. 4, the rasterizer 34 may include, for example, a triangle setting unit 41, an edge processing unit 42, a scan line processing unit 43, and a pixel processing unit 44.

The triangle setting unit 41 may set a triangle by binding every three vertices of an input 3D object. Various aspects of objects may be expressed as a set of polygons having predetermined patterns. A triangle having the simplest pattern is usually used from among the polygons in order to reduce an amount of computation. Hereinafter, it may be assumed that a polygon is a triangle. However, it will be understood by those skilled in the art that any polygon may be applied to one or more embodiments of the present invention.

The edge processing unit 42 may obtain an attribute and another value of each of the pixels forming edges of the set triangle, using an attribute and another value of each of vertices of the set triangle. The edge processing unit 42 will be described in greater detail with reference to FIG. 5 below.

The scan line processing unit 43 may obtain an attribute and another value of an arbitrary pixel in a scan line of the triangle using the attribute and another value of each of the pixels forming the edges of the triangle. The scan line processing unit 43 will be described in greater detail with reference to FIG. 6 below.

The pixel processing unit 44 may determine a final attribute value of each pixel bead on the attribute and another value obtained by the scan line processing unit 43. In order to determine the final attribute value of each pixel, the pixel processing unit 44 may perform various processes, such as, texture mapping, alpha testing, depth testing, and color blending.

Figure 5:
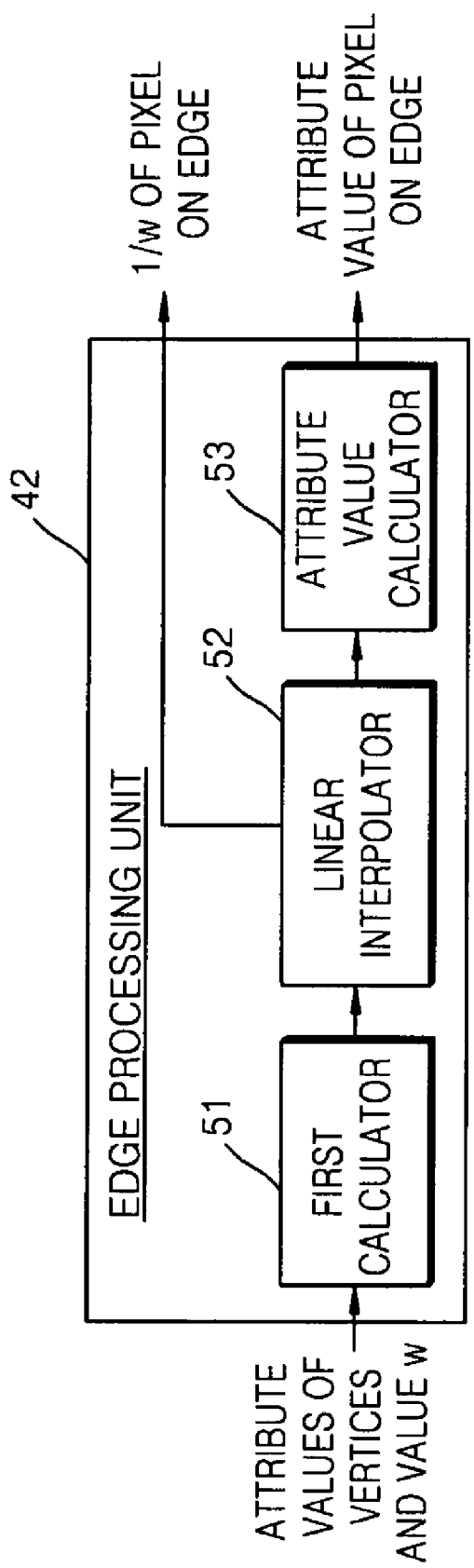
FIG. 5 illustrates an edge processing unit, according to an embodiment of the present invention.

FIG. 5 illustrates edge processing unit 42, according to an embodiment of the present invention. Referring to FIG. 5, the edge processing unit 42 may include, for example, a first calculator 51, a linear interpolator 52, and an attribute value calculator 53.

The first calculator 51 may calculate an inverse number of a homogeneous coordinate and a value obtained by dividing an attribute value by the homogeneous coordinate with respect to each vertex of a triangle. For example, if it is assumed that two vertices forming one of the edges of the triangle are V1 and V2, homogeneous coordinates of the two vertices are respectively w1 and w2, and attribute values of the two vertices are respectively a1 and a2, the first calculator 51 may calculate 1/w1, 1/w2, a1/w1, and a2/w2. In the attribute values, texture coordinates may be expressed in the form of (u, v), and a diffuse color and a specular color may be expressed in the form of (r, g, b).

If it is assumed that an attribute value and a homogeneous coordinate of a selected pixel are respectively a and w, the linear interpolator 52 may obtain an interpolated 1/w value using 1/w1 and 1/w2 with respect to each pixel on the edge, and may obtain an interpolated a/w value using a1/w1 and a2/w2 with respect to each pixel on the edge.

The attribute value calculator 53 may obtain an attribute value of each pixel on the edge by dividing a/w interpolated by the linear interpolator 52 by 1/w, also interpolated by the linear interpolator 52.

As described above, the edge processing unit 42 may calculate an attribute value and a homogeneous coordinate to which perspective correction is applied, with respect to each pixel on the edges of the triangle. The attribute value and the homogeneous coordinate for each edge pixel calculated by the edge processing unit 42 may be input to the scan line processing unit 43 as an attribute value and a homogeneous coordinate of each of both end points of each scan line.

Figure 6:
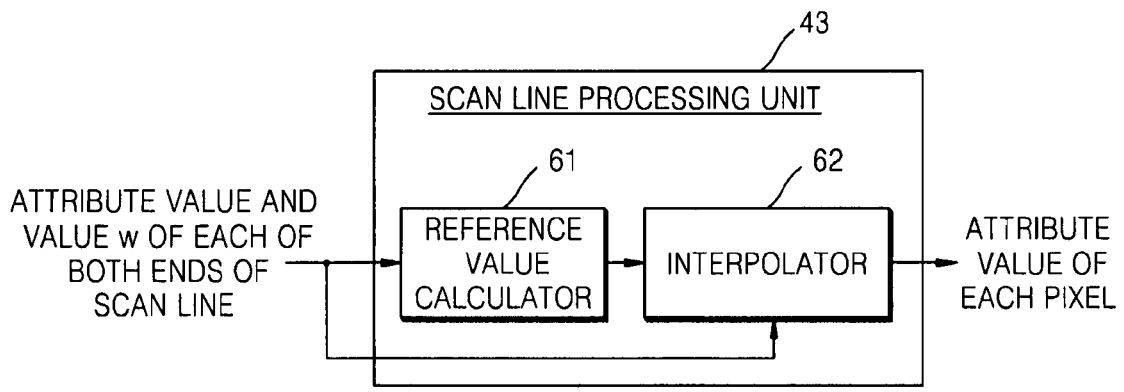
FIG. 6 illustrates a scan line processing unit, according to an embodiment of the present invention.

FIG. 6 illustrates scan line processing unit 43, according to an embodiment of the present invention. Referring to FIG. 6, the line processing unit 43 may include, for example, a reference value calculator 61 and an interpolator 62.

The reference value calculator 61 may calculate a reference value indicating an amount of perspective distortion in an input scan line using homogeneous coordinates of both end points of the input scan line.

Figure 7:
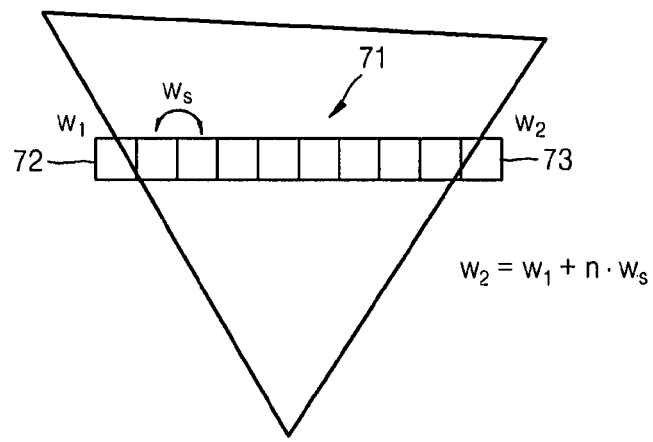
FIG. 7 describes a reference indicating an amount of perspective distortion in a scan line, according to an embodiment of the present invention.

A reference indicating an amount of perspective distortion in a scan line according to an embodiment of the present invention will now be described with reference to FIG. 7. The perspective distortion typically becomes more severe as a distance from a point of view is increased and as a slope between two points in a view direction (z direction) is larger. In FIG. 7, if it is assumed that homogeneous coordinates of pixels 72 and 73 corresponding to both end points of a scan line 71 are respectively w1 and w2, a homogeneous coordinate change ws between adjacent pixels of the scan line 71 may be obtained using, for example, Equation 1 below.

$$w2 = w1 + n \cdot ws \qquad \text{Equation 1:}$$

Here, n denotes the number of pixels distance from pixel 72 to pixel 73, and it is assume that w2 is greater than w1.

If w1 or w2 is significantly greater than ws, it may mean that the homogeneous coordinate variation ws between adjacent pixels is much smaller than the homogeneous coordinate w1 or w2, i.e. that a slope in a view direction is very small or a distance from a point of view is very near. Here, since little perspective distortion occurs, the need for perspective correction is relatively small. On the other hand, if w1 or w2 is not much greater than ws, it may mean that the homogeneous coordinate variation ws between adjacent pixels may be considerably greater than the homogeneous coordinate w1 or w2, i.e. that a slope in a view direction is very large or a distance from a point of view is very far. Here, since the perspective distortion is significant, the need for perspective correction is relatively large.

Thus, a ratio of w1 or w2 to ws, i.e. w1/ws or w2/ws, may be used as a reference for an amount of perspective distortion. In detail, if w1/ws or w2/ws is large, it may be determined that the perspective distortion is small, and if w1/ws or w2/ws is small, it may be determined that the perspective distortion is large.

If it is determined that the perspective distortion is relatively small, i.e., if w1/ws or w2/ws is large, the amount of computation due to the perspective distortion may be reduced by interpolating attribute values by applying perspective correction to only some pixels instead of applying the perspective correction to all pixels on the scan line 71. If it is determined that the perspective distortion is relatively large, i.e., if w1/ws or w2/ws is small, the number of pixels to be interpolated by applying perspective correction may be increased.

The reference value calculator 61 may calculate the homogeneous coordinate variation ws between adjacent pixels using the homogeneous coordinates w1 and w2 of pixels 72 and 73 corresponding to the end points of scan line 71, e.g., using Equation 1. The reference value calculator 61 may also calculate a reference value indicating an amount of perspective distortion using the homogeneous coordinates w1 (or w2) and ws. As described above, the reference value may be calculated using any of w1 and w2. Hereinafter, it is assumed that w1 may be used to calculate the reference value. However, it will be understood by those skilled in the art that w1 may be replaced with w2.

What is used as the reference value indicating an amount of perspective distortion will now be described in greater detail. As described above, although a value obtained by dividing w1 by ws, i.e. w1/ws, may be used as a reference value, here, a division operation is still included, and because a relative difference between w1 and ws rather than the value w1 ws is a meaningful index, it may be beneficial to approximate w1/ws in order to reduce the amount of computation required. For example, a logarithmic operation may be used to approximate w1/ws. Here, the reference value may be calculated using, for example, Equation 2 below.

$$c = n \cdot \log(w1) - m \cdot \log(ws) \qquad \text{Equation 2:}$$

Here, c may denote the reference value indicating an amount of perspective distortion, and n and m may denote integers.

The integers n and m may be arbitrarily selectable parameters when the amount of perspective distortion is represented using a number, and proper values may be selected for the integers n and m based on experiments or simulations, for example in a method of determining a pixel to which perspective correction is applied based on the reference value, which will be described later.

A method of using a digit difference between w1 and ws expressed with predetermined antilogarithmic numbers, e.g., binary numbers, may also be used to approximate w1/ws. Here, the reference value may be calculated using, for example, Equation 3 below.

$$c = p \text{ shift operation}(w1) - q \cdot \text{shift operation}(ws) \qquad \text{Equation 3:}$$

Here, c denotes the reference value indicating an amount of perspective distortion, and p and q denote integers and arbitrarily selectable parameters, as well as m and n in Equation 2. In addition, shift operation(x) denotes the number of right shifts until a result value of 0 is obtained when x expressed with a binary number is right shifted. For example, if ws is 5 and expressed as a binary number 0x0101, a result value of shift operation(x) is 3.

Although two methods to approximate w1/ws have been described, these methods are only illustrations, and it will be understood by those skilled in the art that a variety of approximation methods may exist.

The interpolator 62 may interpolate an attribute value of each of the pixels of scan line 71, and in particular, may interpolate the attribute value by selectively applying perspective correction based on the reference value calculated by the reference value calculator 61. In detail, the interpolator 62 may interpolate an attribute value of each pixel by applying perspective correction using homogeneous coordinates w1 and w2 and attribute values of pixels 72 and 73 corresponding to both ends of the scan line 71 or may interpolate an attribute value of each pixel using a linear interpolation method instead of perspective correction using the attribute values of pixels 72 and 73 corresponding to the ends of scan line 71 or the attribute value interpolated by applying perspective correction.

Figure 8:
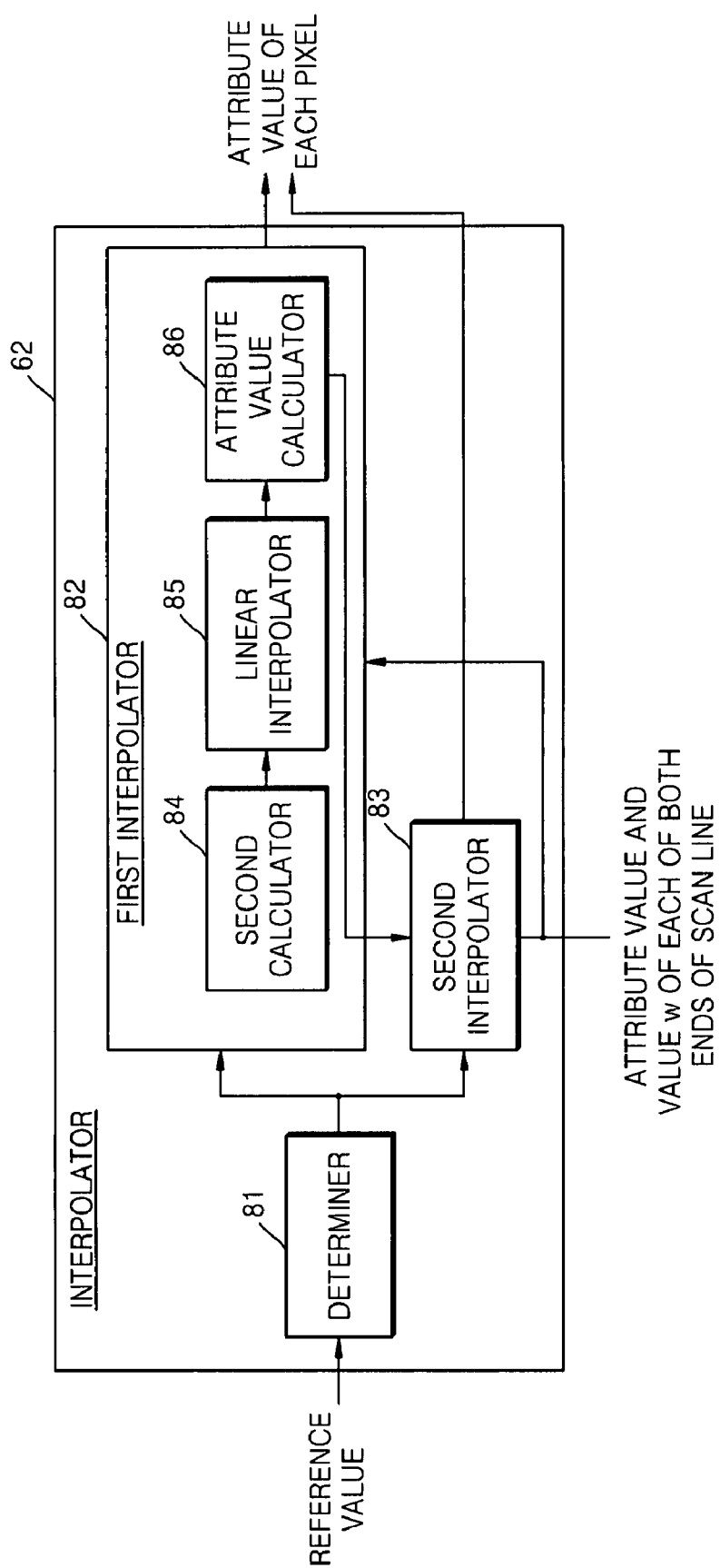
FIG. 8 illustrates an interpolator, according to an embodiment of the present invention.

FIG. 8 illustrates interpolator 62, according to an embodiment of the present invention. Referring to FIG. 8, the interpolator 62 may include, for example, a determiner 81, a first interpolator 82 and a second interpolator 83.

The determiner 81 may determine pixels to be interpolated by applying perspective correction, for example, based on the reference value calculated by the reference value calculator 61. The determiner 81 will now be described in more detail with reference to FIG. 9. The determiner 81 may determine pixels to be interpolated by determining a step size between the pixels to be interpolated based on one of the pixels 72 and 73, corresponding to the ends of scan line 71, e.g., pixel 72. If the step size is 3 for example, pixels 74 and 75, which are to be interpolated by applying perspective correction, are marked with thick boxes in FIG. 9. That is, by determining the step size as 3, the determiner 81 may determine third and sixth pixels from the pixel 72 as the pixels to be interpolated by applying perspective correction. The determiner 81 may determine pixels to be interpolated by applying perspective correction, by determining a step size between pixels to be interpolated without applying perspective correction.

The determiner 81 may decrease the number of pixels to be interpolated by applying perspective correction as the reference value calculated by the reference value calculator 61 is larger, i.e., as an amount of perspective distortion is smaller, and may increase the number of pixels to be interpolated by applying perspective correction as the reference value calculated by the reference value calculator 61 is smaller, i.e., as an amount of perspective distortion is larger. For example, the determiner 81 may adjust the number of pixels to be interpolated by applying perspective correction by increasing the step size as the reference value calculated by the reference value calculator 61 is larger, and decreasing the step size as the reference value calculated by the reference value calculator 61 is smaller.

As a method used by the determiner 81 to determine the number of pixels to be interpolated by applying perspective correction based on the reference value calculated by the reference value calculator 61, or determine the step size, a lookup table in which the number of pixels or the step size is determined according to a range of the reference value may be prepared, or the number of pixels or the step size may be calculated by performing a predetermined operation using the reference value.

The first interpolator 82 may interpolate an attribute value for each of the pixels determined by the determiner 81, by applying perspective correction, e.g. a hyperbolic interpolation method.

The first interpolator 82 may include, for example, a second calculator 84, a linear interpolator 85, and an attribute value calculator 86. The second calculator 84 may calculate an inverse number of a homogeneous coordinate and a value obtained by dividing an attribute value by the homogeneous coordinate with respect to both pixels corresponding to end points of a scan line. For example, if it is assumed that the homogeneous coordinates of pixels 72 and 73, corresponding to the end points of the scan line 71, are respectively w1 and w2, and attribute values of the pixels 72 and 73 are respectively a1 and a2, the second calculator 84 may calculate 1/w1, 1/w2, a1/w1, and a2/w2. In the attribute values, texture coordinates may be expressed in the form of (u, v), and a diffuse color and a specular color may be expressed in the form of (r, g, b).

Figure 9:
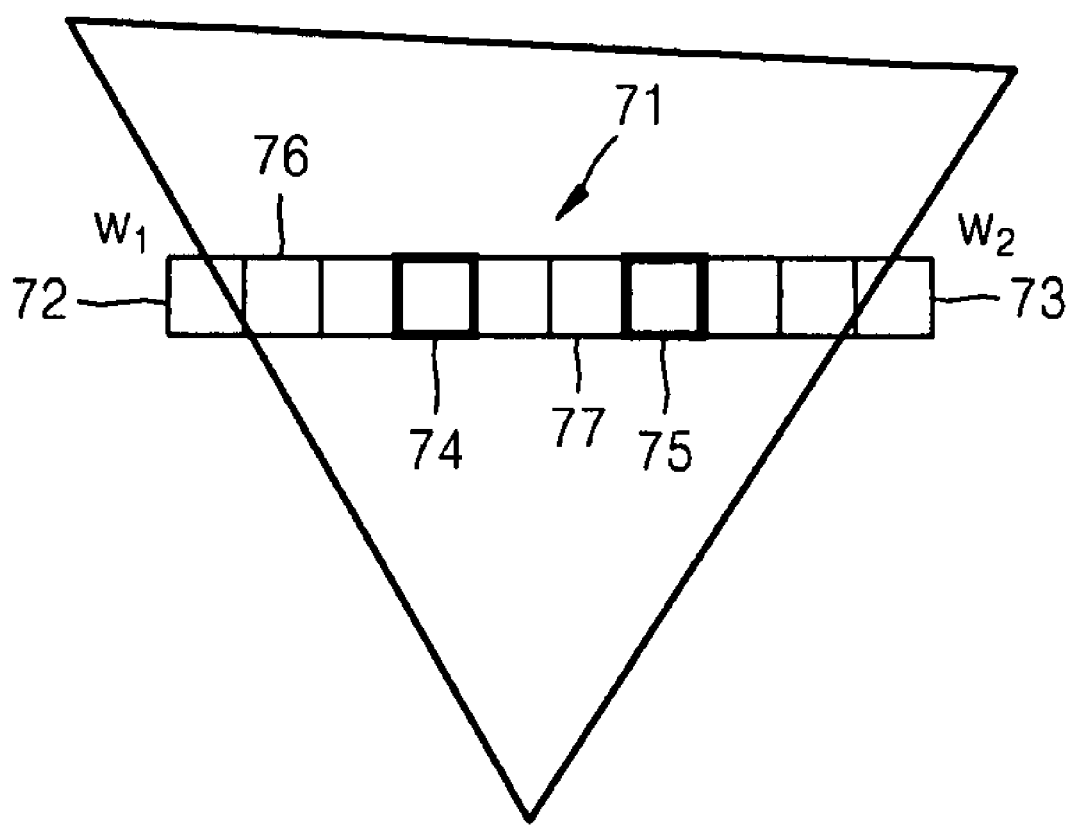
FIG. 9 illustrates a method determining pixels to be interpolated by applying perspective correction, according to an embodiment of the present invention.

The linear interpolator 85 may interpolate an inverse number of a homogeneous coordinate and a value obtained by dividing an attribute value by the homogeneous coordinate with respect to each of the pixels determined to be interpolated by applying perspective correction by the determiner 81, e.g., each of pixels 74 and 75 illustrated in FIG. 9. That is, if it is assumed that an attribute value and a homogeneous coordinate of the pixel 74 are respectively a and w, the linear interpolator 85 may linearly interpolate 1/w using 1/w1 and 1/w2 and linearly interpolate a/w using a1/w1 and a2/w2.

The attribute value calculator 86 may calculate an attribute value interpolated by applying perspective correction, by dividing the linearly interpolated value, obtained by dividing an attribute value by a homogeneous coordinate, by a linearly interpolated inverse number of the homogeneous coordinate. For example, with respect to pixel 74, an attribute value a interpolated by applying perspective correction may be obtained by dividing a/w by 1/w.

The second interpolator 83 may interpolate, using a linear interpolation method, pixels remaining after excluding pixels determined to be interpolated by applying perspective correction by the determiner 81. The second interpolator 83 will now be described in more detail with reference to FIG. 9. For example, when pixels 74 and 75 are determined to be interpolated by applying perspective correction, those pixels remaining after excluding pixels 74 and 75, and pixels 72 and 73 corresponding to the end points of the scan line 71, e.g. pixels 76 and 77, may become pixels to be interpolated by the second interpolator 83. Here, the second interpolator 83 may linearly interpolate an attribute value of pixel 76 using an attribute value of pixel 72 and an attribute value of pixel 74. The second interpolator 83 may also linearly interpolate an attribute value of pixel 77 using the attribute value of pixel 74 and the attribute value of pixel 75, calculated by the attribute value calculator 86.

According to the configurations of the determiner 81, the first interpolator 82 and the second interpolator 83, attribute values of some pixels on a scan line according to the reference value determined by the reference value calculator 61 may be interpolated by applying perspective correction, and attribute values of other pixels may be interpolated by applying a linear interpolation method. Thus, since the number of division operations required to apply perspective correction is reduced, the amount of required computation is significantly reduced compared to techniques applying perspective correction to all pixels. Furthermore, since the number of pixels to which perspective correction is applied is adaptively determined considering an amount of perspective distortion, when compared to a technique applying perspective correction to all pixels, degradation of image quality, which may occur by not applying perspective correction to some pixels, may be minimized.

Figure 10:
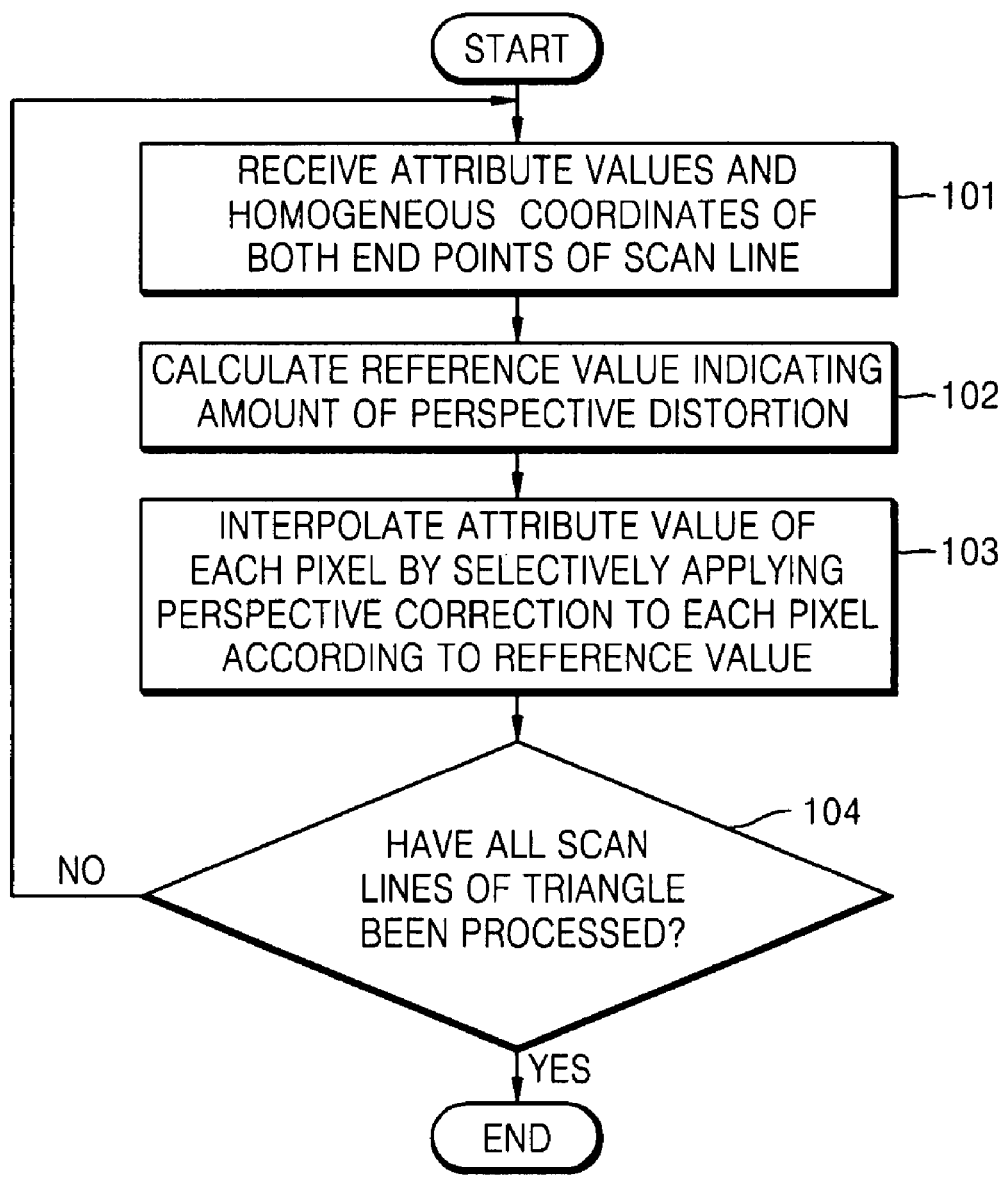
FIG. 10 illustrates a 3D graphics processing method, according to an embodiment of the present invention.

FIG. 10 illustrates a 3D graphics processing method according to an embodiment of the present invention. The 3D graphics processing method according to an embodiment may include, without limitation, operations processed by the 3D graphics processing apparatus described above. Thus, although not fully described, the contents relating to the 3D graphics processing apparatus may also apply to a 3D graphics processing method, according to one or more embodiments of the present invention.

Referring to FIG. 10, the 3D graphics processing apparatus may receive an attribute value and a homogeneous coordinate of each of the end points of a scan line in operation 101.

The 3D graphics processing apparatus may calculate a reference value indicating an amount of perspective distortion in the scan line using the received homogeneous coordinates in operation 102. The reference value may be calculated based on one of the homogeneous coordinates of the end points of the scan line and a homogeneous coordinate change between adjacent pixels.

In operation 103, the 3D graphics processing apparatus may interpolate an attribute value of each of the pixels of the scan line by selectively applying perspective correction to each pixel based on the reference value calculated in operation 102. In operation 103, an attribute value of each pixel may be calculated using the hyperbolic interpolation method when the interpolation is performed by applying perspective correction or using a linear interpolation method when the interpolation is performed without applying perspective the correction.

The 3D graphics processing apparatus may determine in operation 104 whether operations 101 through 103 have been performed for all scan lines of a triangle. If it is determined in operation 104 that operations 101 through 103 have not been performed for all scan lines of a triangle, the process may return to operation 101 in order to perform operations 101 through 103 for the remaining scan lines. If it is determined in operation 104 that operations 101 through 103 have been performed for all scan lines of a triangle, the process may be terminated.

Figure 11:
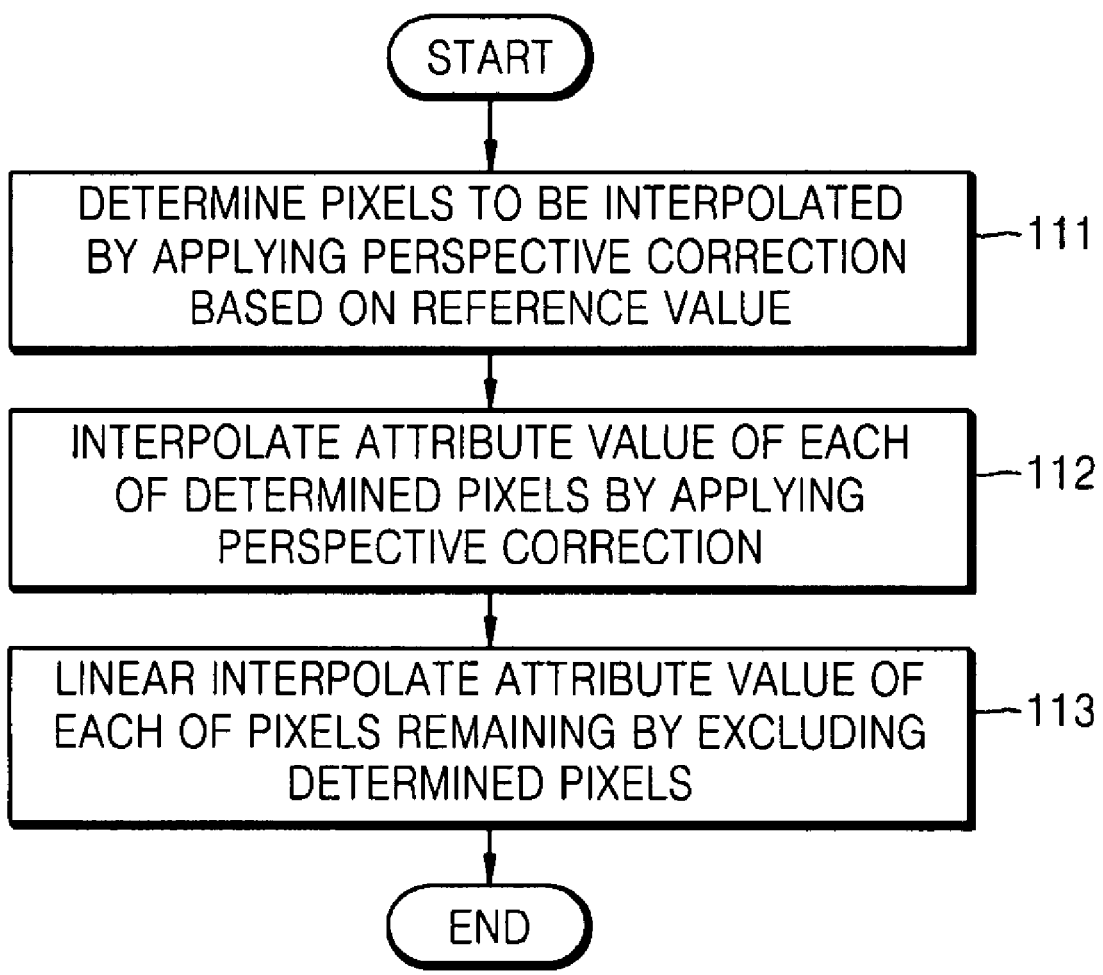
FIG. 11 illustrates a process interpolating an attribute value by selectively applying perspective correction for each pixel based on a reference value, according to an embodiment of the present invention.

FIG. 11 illustrates operation 103 illustrated in FIG. 10, according to an embodiment of the present invention.

Referring to FIG. 11, in operation 111, the 3D graphics processing apparatus may determine pixels to be interpolated by applying perspective correction from among pixels of a scan line, based on the reference value calculated in operation 102 illustrated in FIG. 10. Here, the pixels to be interpolated may be determined by determining a step size between the pixels to be interpolated by applying perspective correction, or a step size between pixels to be interpolated without applying perspective correction, based on one of the pixels corresponding to end points of the scan line.

In operation 112, the 3D graphics processing apparatus may interpolate an attribute value of some pixels by applying perspective correction to the pixels according to the result determined in operation 111.

In operation 113, the 3D graphics processing apparatus may linearly interpolate an attribute value of each remaining pixel by excluding the pixels interpolated in operation 112 using the attribute values of the pixels corresponding to the end points of the scan line and the attribute values of the pixels interpolated in operation 112, according to the result determined in operation 111.

Figure 12:
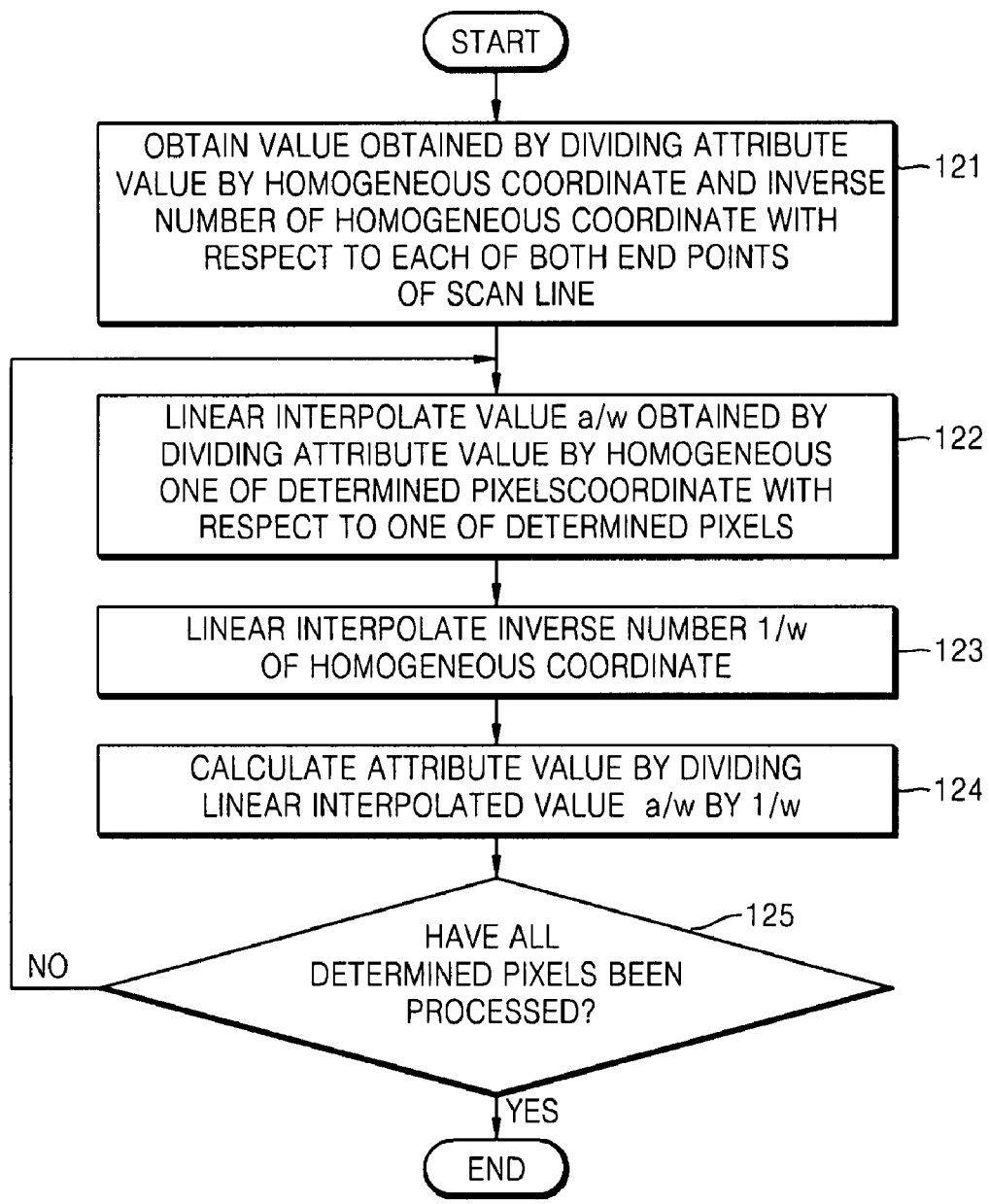
FIG. 12 illustrates a process of performing linear interpolation of attribute values for pixels except determined pixels, according to an embodiment of the present invention.

FIG. 12 illustrates operation 112 illustrated in FIG. 11, according to an embodiment of the present invention.

Referring to FIG. 12, a 3D graphics processing apparatus, for example, may obtain a value obtained by dividing the attribute value by the homogeneous coordinate and an inverse number of the homogeneous coordinate with respect to each of the both end points of the scan line in operation 121.

In operation 122, the 3D graphics processing apparatus may linearly interpolate a value a/w, obtained by dividing an attribute value by a homogeneous coordinate, with respect to one of the pixels determined to be interpolated by applying perspective correction according to the result determined in operation 111.

The 3D graphics processing apparatus may linearly interpolate an inverse number 1/w of the homogeneous coordinate with respect to the pixel in operation 123.

The 3D graphics processing apparatus may calculate an attribute value interpolated by applying perspective correction with respect to the pixel, by dividing the linear interpolated value a/w, obtained by dividing the attribute value by the homogeneous coordinate, by linearly interpolated inverse number 1/w of the homogeneous coordinate, in operation 124.

The 3D graphics processing apparatus may determine in operation 125 whether operations 122 through 124 have been performed for all the pixels determined to be interpolated by applying perspective correction according to the result determined in operation 111. If it is determined in operation 125 that operations 122 through 124 have been performed for all the pixels, the process may return to operation 122 in order to perform operations 122 through 124 for the remaining pixels. If it is determined in operation 125 that operations 122 through 124 have been performed for all the pixels, the process may terminate.

According to the 3D graphics processing method described above, attribute values may be interpolated by applying perspective correction with respect to some pixels of a scan line according to the reference value calculated in operation 102, and attribute values may be interpolated by applying a linear interpolation method with respect to the remaining pixels. Thus, since the number of division operations required to apply perspective correction is reduced, the amount of needed computation is significantly reduced compared to the technique of applying perspective correction to all pixels. Furthermore, since the number of pixels to which the perspective correction is applied is adaptively determined considering an amount of perspective distortion, when compared to the technique of applying perspective correction to all pixels, degradation of image quality, which may occur by not applying perspective correction to some pixels, may be minimized.

In addition to the above described embodiments, embodiments of the present invention may also be implemented through computer readable code/instructions in/on a medium, e.g., a computer readable medium, to control at least one processing element to implement any above described embodiment. The medium can correspond to any medium/media permitting the storing and/or transmission of the computer readable code.

The computer readable code may be recorded/transferred on a medium in a variety of ways, with examples of the medium including recording media, such as magnetic storage media (e.g., ROM, floppy disks, hard disks, etc.) and optical recording media (e.g., CD-ROMs, or DVDs) Still further, as only an example, the processing element could include a processor or a computer processor, and processing elements may be distributed and/or included in a single device.

Although a few embodiments have been shown and described, it would be appreciated by those skilled in the art that changes may be made in these embodiments without departing from the principles and spirit of the invention, the scope of which is defined in the claims and their equivalents.

What is claimed is:

1. A 3-dimensional (3D) graphics processing method, performed in a 3-dimensional graphics processing apparatus comprising:
   (a) receiving a homogeneous coordinate and an attribute value of each of both end points of one scan line of a polygon composed of a plurality of perspective projected vertices;
   (b) calculating a reference value indicating an amount of perspective distortion in the scan line using the received homogeneous coordinates; and
   (c) interpolating, using a processor, an attribute value of each pixel of the scan line using at least some of the received homogeneous coordinates and attribute values, the attribute value is interpolated by determining at least one pixel, to be interpolated, from among pixels of the scan line based on the reference value and applying perspective correction to the determined pixel,
   wherein (c) comprises linearly interpolating a value obtained by dividing an attribute value by a homogeneous coordinate with respect to one of the determined pixels using a value obtained by dividing an attribute value by a homogeneous coordinate with respect to each of the both end points, linear interpolating an inverse number of the homogeneous coordinate with respect to the pixel using inverse numbers of the homogeneous coordinates with respect to the both end points, and calculating an attribute value interpolated by applying the perspective correction, by dividing the linear interpolated value, which is obtained by dividing the attribute value by the homogeneous coordinate, by a linear interpolated inverse number of the homogeneous coordinate.

2. The 3D graphics processing method of claim 1, wherein the plurality of vertices are three vertices, and the polygon is a triangle.

3. The 3D graphics processing method of claim 1, wherein (b) comprises calculating the reference value based on at least one of the homogeneous coordinates of the both end points and a homogeneous coordinate change between adjacent pixels of the scan line.

4. The 3D graphics processing method of claim 3, wherein the reference value is a ratio of the at least one of the homogeneous coordinates of the both end points to the homogeneous coordinate change between adjacent pixels of the scan line.

5. The 3D graphics processing method of claim 3, wherein each of the at least one of the homogeneous coordinates of the both end points and the homogeneous coordinate change between adjacent pixels of the scan line is expressed by a predetermined antilogarithmic number, and the reference value is calculated using the number of digits of each of the predetermined antilogarithmic numbers.

6. The 3D graphics processing method of claim 5, wherein the number of digits of each of the predetermined antilogarithmic numbers is obtained by shifting each of the predetermined antilogarithmic numbers.

7. The 3D graphics processing method of claim 1, wherein (c) comprises interpolating the attribute values using perspective correction according to a hyperbolic interpolation method.

8. The 3D graphics processing method of claim 1, wherein (c) comprises:
   (c1) determining pixels that are to be interpolated by applying perspective correction, based on the reference value;
   (c2) interpolating an attribute value of each of the determined pixels by applying perspective correction according to a result of the determination; and
   (c3) linear interpolating an attribute value of each of pixels remaining by excluding the determined pixels.

9. The 3D graphics processing method of claim 8, wherein (c3) comprises linear interpolating the attribute value of each of pixels remaining by excluding the determined pixels, using at least some of the attribute values of the both end points and the attribute value interpolated by applying the perspective correction.

10. The 3D graphics processing method of claim 1, wherein the attribute value comprises at least one of texture coordinates, a diffuse color, and a specular color.

11. The 3D graphics processing method of claim 1, wherein the attribute value is interpolated by determining a step size between pixels to be interpolated based on one of both end points of the scan line and applying perspective correction to pixels according to the determined step size.

12. A 3-dimensional (3D) graphics processing method, performed in a 3-dimensional graphics processing apparatus, the method comprising:
   (a) receiving a homogeneous coordinate and an attribute value of each of both end points of one scan line of a polygon composed of a plurality of perspective projected vertices;
   (b) calculating a reference value indicating an amount of perspective distortion in the scan line using the received homogeneous coordinates; and
   (c) interpolating, using a processor, an attribute value of each pixel of the scan line using at least some of the received homogeneous coordinates and attribute values, the attribute value being interpolated by determining at least one pixel, to be interpolated, from among pixels of the scan line based on the reference value and applying perspective correction to the determined pixel,
   wherein (b) comprises calculating the reference value based on at least one of the homogeneous coordinates of the both end points and a homogeneous coordinate change between adjacent pixels of the scan line, and the reference value is calculated using a logarithmic value of the at least one of the homogeneous coordinates of the both end points and a logarithmic value of the homogeneous coordinate change between adjacent pixels of the scan line.

13. A non-transitory computer readable recording medium storing a computer readable program for executing the 3D graphics processing method of any of claims 1 through 10.

14. A 3-dimensional (3D) graphics processing apparatus comprising:
   a reference value calculator receiving a homogeneous coordinate and an attribute value of each of both end points of one scan line of a polygon composed of a plurality of perspective projected vertices and calculating a reference value indicating an amount of perspective distortion in the scan line using the received homogeneous coordinates; and
   an interpolator, implemented by using a processor, interpolating an attribute value of each of pixels of the scan line using at least some of the received homogeneous coordinates and the received attribute values of the both end points, the attribute value interpolated by determining at least one pixel, to be interpolated, from among pixels of the scan line based on the reference value and applying perspective correction to the determined pixel, wherein the interpolator includes a linear interpolator linear interpolating a value obtained by dividing an attribute value by a homogeneous coordinate with respect to one of the determined pixels using a value obtained by dividing an attribute value by a homogeneous coordinate with respect to each of the both end points, and linear interpolating an inverse number of the homogeneous coordinate with respect to the pixel using inverse numbers of the homogeneous coordinates with respect to the both end points, and an attribute value calculator calculating an attribute value interpolated by applying the perspective correction, by dividing the linear interpolated value, which is obtained by dividing the attribute value by the homogeneous coordinate, by linear interpolated inverse number of the homogeneous coordinate.

15. The 3D graphics processing apparatus of claim 14, wherein the plurality of vertices are three vertices, and the polygon is a triangle.

16. The 3D graphics processing apparatus of claim 14, wherein the reference value calculator calculates the reference value based on at least one of the homogeneous coordinates of the both end points and a homogeneous coordinate change between adjacent pixels of the scan line.

17. The 3D graphics processing apparatus of claim 16, wherein the reference value is a ratio of the at least one of the homogeneous coordinates of the both end points to the homogeneous coordinate change between adjacent pixels of the scan line.

18. The 3D graphics processing apparatus of claim 16, wherein each of the at least one of the homogeneous coordinates of the both end points and the homogeneous coordinate change between adjacent pixels of the scan line is expressed by a predetermined antilogarithmic number, and the reference value is calculated using the number of digits of each of the predetermined antilogarithmic numbers.

19. The 3D graphics processing apparatus of claim 18, wherein the number of digits of each of the predetermined antilogarithmic numbers is obtained by shifting each of the predetermined antilogarithmic numbers.

20. The 3D graphics processing apparatus of claim 14, wherein the interpolator interpolates the attribute values using perspective correction according to a hyperbolic interpolation method.

21. The 3D graphics processing apparatus of claim 14, wherein the interpolator comprises:
a determiner determining pixels that are to be interpolated by applying perspective correction, based on the reference value;
a first interpolator interpolating an attribute value of each of the determined pixels by applying perspective correction according to a result of the determination; and
a second interpolator linear interpolating an attribute value of each of pixels remaining by excluding the determined pixels.

22. The 3D graphics processing apparatus of claim 21, wherein the first interpolator includes the
linear interpolator and the
attribute value calculator.

23. The 3D graphics processing apparatus of claim 21, wherein the second interpolator linear interpolates the attribute value of each of pixels remaining by excluding the determined pixels, using at least some of the attribute values of the both end points and the attribute value interpolated by applying the perspective correction.

24. The 3D graphics processing apparatus of claim 14, wherein the attribute value comprises at least one of texture coordinates, a diffuse color, and a specular color.

25. The 3D graphics processing apparatus of claim 14, wherein the attribute value is interpolated by determining a step size between pixels to be interpolated based on one of both end points of the scan line and applying perspective correction to pixels according to the determined step size.

26. A 3-dimensional (3D) graphics processing apparatus comprising:
a reference value calculator receiving a homogeneous coordinate and an attribute value of each of both end points of one scan line of a polygon composed of a plurality of perspective projected vertices and calculating a reference value indicating an amount of perspective distortion in the scan line using the received homogeneous coordinates; and
an interpolator, implemented by using a processor, interpolating an attribute value of each pixel of the scan line using at least some of the received homogeneous coordinates and the received attribute values of the both end points, the attribute value being interpolated by determining at least one pixel, to be interpolated, from among pixels of the scan line based on the reference value and applying perspective correction to the determined pixel, wherein the reference value calculator calculates the reference value based on at least one of the homogeneous coordinates of the both end points and a homogeneous coordinate change between adjacent pixels of the scan line and the reference value is calculated using a logarithmic value of the at least one of the homogeneous coordinates of the both end points and a logarithmic value of the homogeneous coordinate change between adjacent pixels of the scan line.

* * * * *